US008380798B2

(12) United States Patent
Jackson et al.

(10) Patent No.: US 8,380,798 B2
(45) Date of Patent: Feb. 19, 2013

(54) STATUS MESSAGE DE-DUPLICATION

(75) Inventors: Todd Jackson, San Francisco, CA (US); David M. Cohen, Mountain View, CA (US)

(73) Assignee: Google Inc., Mountain View, CA (US)

( * ) Notice: Subject to any disclaimer, the term of this patent is extended or adjusted under 35 U.S.C. 154(b) by 373 days.

(21) Appl. No.: 12/702,022

(22) Filed: Feb. 8, 2010

(65) Prior Publication Data

US 2011/0196932 A1 Aug. 11, 2011

(51) Int. Cl.
*G06F 15/16* (2006.01)
(52) U.S. Cl. .................. 709/206; 709/201; 709/202
(58) Field of Classification Search ............. 709/206
See application file for complete search history.

(56) References Cited

U.S. PATENT DOCUMENTS

2008/0313208 A1 12/2008 Hourselt et al.
2009/0259650 A1 10/2009 Schuil

OTHER PUBLICATIONS

Lee W. Young, International Search Report/Written Opinion in PCT/US11/20641, mailed May 2, 2011, 8 pages.
International Preliminary Report on Patentability, received in corresponding International Patent Application No. PCT/US2011/020641, mailed Aug. 23, 2012, (7 pages).

*Primary Examiner* — Firmin Backer
*Assistant Examiner* — Keyvan Emdadi
(74) *Attorney, Agent, or Firm* — Holland & Knight LLP; Brian J. Colandreo, Esq.; Jeffrey T. Placker, Esq.

(57) ABSTRACT

In one aspect, a computer-implemented method of de-duplication of messages in a micro-blog includes receiving a first message and posting the first message to the micro-blog, receiving a second message, and classifying the second message as a new message or an edited version of the first message.

20 Claims, 14 Drawing Sheets

To FIG. 1B

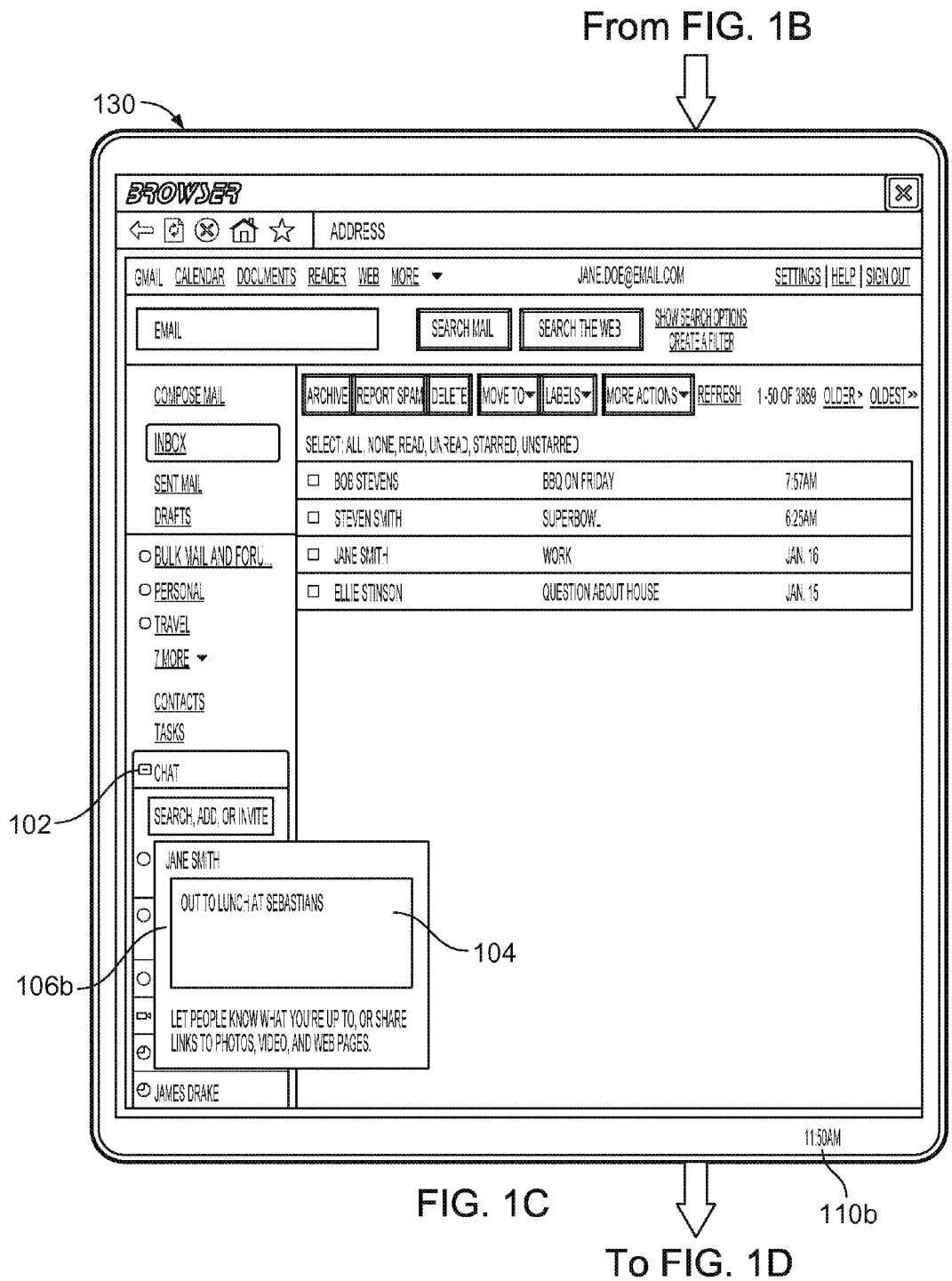

432 — Message 1 = BRB
433 — Message 2 = BRB, Out to Lunch
434 — Substring Length = 3

| Calculation | String #1 | String #2 | Edit Distance |
|---|---|---|---|
| 435 → Full Text Edit Distance | BRB | BRB, Out to Lunch | 14 |
| 436 → Beginning Edit Distance | BRB | BRB | 0 |
| 437 → Ending Edit Distance | BRB | nch | 3 |

FIG. 4B

442 — Message 1 = It's Finally Friiday
443 — Message 2 = It's Finally Friday
444 — Substring Length = 20

| Calculation | String #1 | String #2 | Edit Distance |
|---|---|---|---|
| 445 → Full Text Edit Distance | It's Finally Friday. | It's Finally Friiday. | 1 |
| 446 → Beginning Edit Distance | It's Finally Friday. | t's Finally Friiday. | 2 |
| 447 → Ending Edit Distance | It's Finally Friday. | It's Finally Friiday | 2 |

FIG. 4C

452 — Message 1 = Go Purdue, Exciting Game!
453 — Message 2 = Exciting Game!
454 — Substring Length = 14

| Calculation | String #1 | String #2 | Edit Distance |
|---|---|---|---|
| 455 → Full Text Edit Distance | Exciting Game! | Go Purdue, Exciting Game! | 11 |
| 456 → Beginning Edit Distance | Exciting Game! | Go Purdue, Exc | 12 |
| 457 → Ending Edit Distance | Exciting Game! | Exciting Game! | 0 |

STATUS MESSAGE DE-DUPLICATION

TECHNICAL FIELD

This document generally describes systems, computer program products, and methods for de-duplication of postings in a micro-blog.

BACKGROUND

In recent years, micro-blogging has increased in popularity. In general, micro-blogging allows a user to share short textual posts with a group of individuals associated with the user. In a micro-blogging system, the user generates a submission (referred to herein as a post) that is re-transmitted to the group of individuals associated with the user. Based on the user's post, other users may comment or add additional information to the post generating a series of posts (referred to herein as a thread) that records a conversation by the micro-blogging group.

SUMMARY

This document describes techniques for de-duplication of messages posted in a micro-blog. In some examples, multiple similar postings or near copies of prior postings can be removed from the micro-blog. For example, status messages associated with instant messaging or chat applications can be broadcast to a larger group of micro-bloggers (e.g., users who have subscribed to receive status messages from a particular user). Broadcasting the status messages allows micro-blog users following the individual who has updated his/her status message to receive and view the status messages. In the instant messaging or chat applications the user may update his/her status message to make minor changes or edits to the status message. When such status messages are posted to a micro-blog, it can result in multiple posts that are similar in content appearing on the micro-blog. In order to reduce the number of near copies or similar posts received by those users following the micro-blogger, a de-duplication application detects status messages that are likely to be intended as edits to a previous status message rather than a new message. Status messages can be classified as edits to a previous status message based on time (e.g., if they occur within a certain time periods from the prior message) and/or based on character comparison of the two messages. If a status message is classified as an edit, the updated status message can replace a previous posting in the micro-blog such that near duplicate messages do not appear in the micro-blog.

In one implementation, a computer-implemented method of de-duplication of messages in a micro-blog includes receiving, at a computer system, a first message and posting the first message to the micro-blog. The method also includes receiving, at the computer system, a second message. The method also includes classifying, by the computer system, the second message as a new message or an edited version of the first message. The method also includes updating the first message in the micro-blog based on the second message if the second message is classified as an edited version of the first message and posting the second message to the micro-blog in addition to the first message if the second message is classified as a new message.

Embodiments can include one or more of the following.

Updating the first message in the micro-blog based on the second message can include overwriting the first message. Overwriting the first message in the micro-blog can include displaying the second message and removing the first message. Receiving the first message can include receiving a first user-generated status message from an instant messaging application and receiving the second message can include receiving a second user-generated status message from the instant messaging application. Classifying the second message can include classifying the second message based on a measure of similarity between the first and second messages. Classifying the second message can include classifying the second message based on one or more edit distance calculations. Classifying the second message can include calculating a first edit distance based on a comparison of the text in the first and second messages, calculating a second edit distance based on a comparison of the text in the shorter of the first and second messages and a beginning portion of the longer of the first and second messages, and calculating a third edit distance based on a comparison of the text in the shorter of the first and second messages and an ending portion of the longer of the first and second messages. Classifying the second message can include determining a minimum of the first, second, and third edit distances, comparing the minimum to an edit distance threshold, and classifying the message as an edited version of the first message if the minimum is less than the edit distance threshold. The edit distance threshold can be based on a number of operations to transform one of the first message and the second message into the other one of the first and second messages. The edit distance threshold can be based on a ratio of a number of operations to transform the shorter one of the first message and the second message into the longer one of the first and second messages to the number of characters in the longer one of the first and second messages. Classifying the second message includes classifying the second message based on one or more temporal thresholds. The one or more temporal thresholds can include an edit threshold and classifying the second message includes classifying the second message as an edited version of the first message if the elapsed time between receipt of the first and second messages is less than the threshold. The edit threshold can be from about 5 minutes to about 20 minutes. The one or more temporal thresholds can be a new message threshold and classifying the second message includes classifying the second message as a new message if the elapsed time between receipt of the first and second messages is greater than the new message threshold. The new message threshold can be from about 10 hours to about 36 hours.

In another aspect, an electronic system for de-duplication of messages in a micro-blog can include a memory and a processor. The processor can be configured to receive a first message, post the first message to the micro-blog, receive a second message, classify the second message as a new message or an edited version of the first message, update the first message in the micro-blog based on the second message if the second message is classified as an edited version of the first message, and post the second message to the micro-blog in addition to the first message if the second message is classified as a new message.

Embodiments can include one or more of the following.

The processor can be further configured to receive the first and second status messaged from an instant messaging application. The processor can be further configured to classify the second message based on one or more edit distance calculations. The processor can be further configured to classify the second message by calculating a first edit distance based on a comparison of the text in the first and second messages, calculating a second edit distance based on a comparison of the text in the shorter of the first and second messages and a beginning portion of the longer of the first and second messages, and calculating a third edit distance based on a comparison of the text in the shorter of the first and second messages and an ending portion of the longer of the first and second messages. The processor can be further configured to classify the second message by determining a minimum of the first, second, and third edit distances, comparing the minimum to an edit distance threshold, and classifying the message as an edited version of the first message if the minimum is less than the edit distance threshold. The processor can be further configured to classify the second message based on one or more temporal thresholds.

In some additional aspects, an electronic system for de-duplication of messages in a micro-blog includes a device configured to receive first and second messages, a device configured to post the first message to a micro-blog, and means for classifying the second message as a new message or an edited version of the first message and updating the micro-blog based on the classification.

Embodiments can include one or more of the following.

The means for classifying the second message and updating the micro-blog based on the classification can include a means for updating the first message in the micro-blog based on the second message if the second message is classified as an edited version of the first message and posting the second message to the micro-blog in addition to the first message if the second message is classified as a new message. The means for classifying the second message and updating the micro-blog based on the classification can include a means for classifying the second message based on one or more edit distance calculations. The means for classifying the second message and updating the micro-blog based on the classification can include means for calculating a first edit distance based on a comparison of the text in the first and second messages, calculating a second edit distance based on a comparison of the text in the shorter of the first and second messages and a beginning portion of the longer of the first and second messages, and calculating a third edit distance based on a comparison of the text in the shorter of the first and second messages and an ending portion of the longer of the first and second messages.

The details of one or more embodiments are set forth in the accompanying drawings and the description below. Other features, objects, and advantages of the invention will be apparent from the description and drawings, and from the claims.

DESCRIPTION OF DRAWINGS

FIGS. 4B, 4C, and 4D are tables showing exemplary edit distance determinations.

Like reference symbols in the various drawings indicate like elements.

DETAILED DESCRIPTION

Figure 1A:
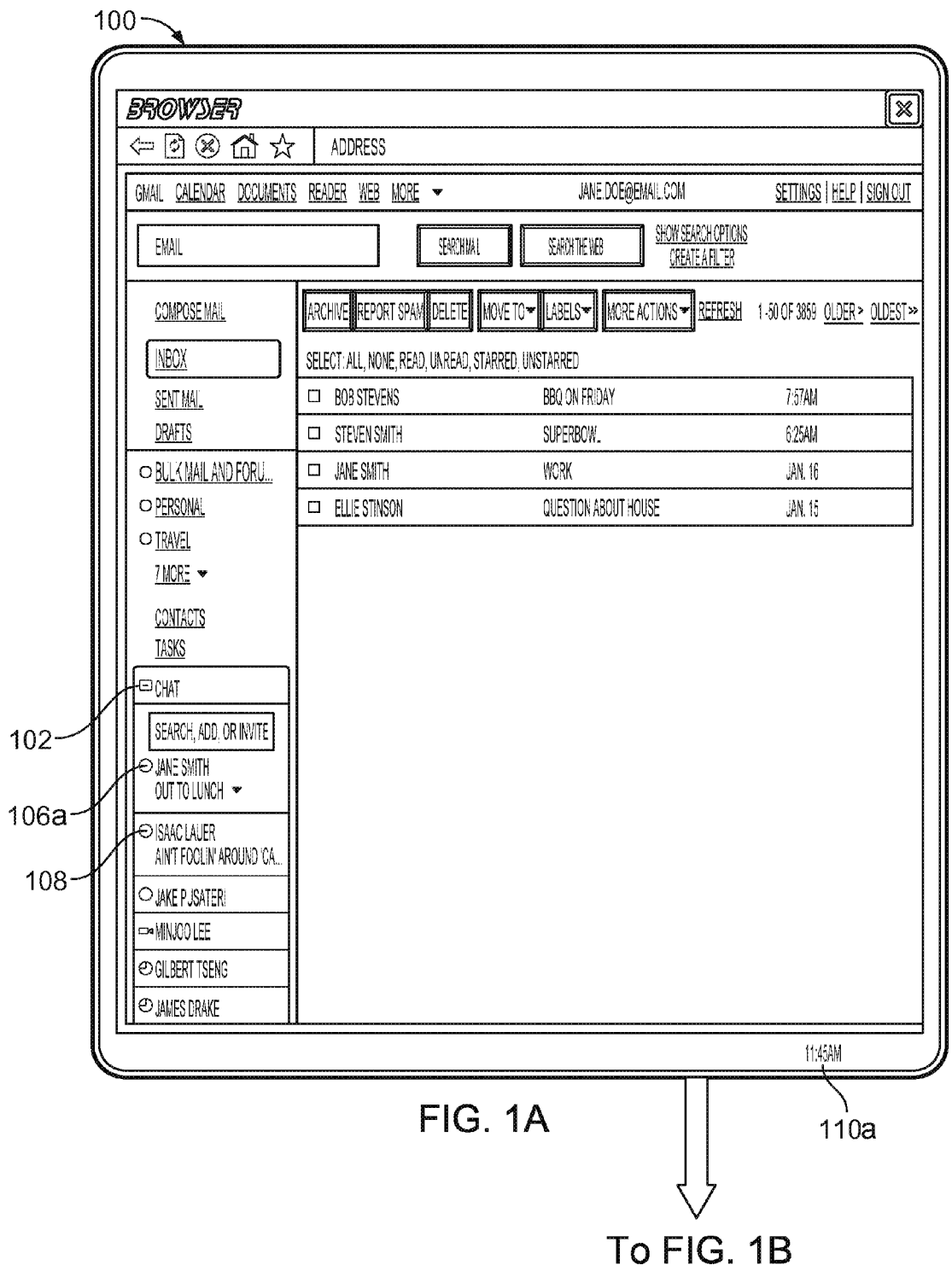
FIG. 1 is a diagram of exemplary user interfaces for instant messaging and micro-blogging applications.

Micro-blogging and online instant messaging (also referred to as synchronous conferencing or chat) provide ways for individuals to communicate with other users and to start conversations over the Internet. Both micro-blogging and instant messaging can provide the advantage of allowing an individual to provide a broadcasted update on his/her current actions, activities, or thoughts to others who may be interested in such information.

In general, a micro-blog is a system/process of submitting relatively short posts (e.g., user submissions) that are automatically broadcast to a group of people who have been associated with the user. Micro-blogs encourage other users to comment on a post thereby generating a thread or a series of posts that are correlated with each other. People can become associated with a particular user, topic, or thread by subscribing to follow the user, topic, or thread. Subscribing is an act by a user of showing an intent to receive posts from a particular thread, from a particular user (e.g., you become a "follower" of the user), or to a particular topic.

Instant messaging (also referred to as synchronous conferencing or chat) is a form of real-time direct text-based communication between two or more individuals using shared clients. Online chat often uses tools such as instant messengers, Internet Relay Chat, talkers and possibly MUDs. Instant messaging applications often allow a user to post a status message that appears automatically to other users. A status message can tell other contacts the user's current status, such as being busy or what the user is currently doing and are often displayed even if the person is present. Status messages are often updated frequently and thus, may serve as a means of instant, limited "publication" or indirect communication.

The status messages in an instant messaging application can be viewed by other users of the instant messaging or chat system. It is believed that importing status messages from the instant messaging system to a micro-blog can be advantageous because it allows the status messages to be more widely viewed and to become the starting point of conversations.

In order to incorporate chat status messages as posts in a micro-blog, the status messages can be automatically imported into the micro-blog. However, users are likely to update their chat status messages more frequently than they would post new entries in a micro-blog because, unlike a micro-blog which shows all posts by the user, the instant messaging application shows only the most recent status message. For example, a user may edit or retype their status message multiple times or update their status message to append additional words or remove a portion of the status message. This ephemeral nature of status messages, can result in multiple near-copies being posted to the micro-blog if the status messages are not filtered prior to posting them on the micro-blog. In filtering the status message, status messages can be classified as new status messages or edits to previous status messages. Status messages can be classified as edits based on temporal measures (e.g., if they occur within a certain time periods from the prior message) and/or based on the similarity of the two messages (e.g., based on a character comparison of the two messages). Advantageously, the described systems and methods detect status messages that are likely to be intended as edits to an existing message and replace the existing post in the micro-blog rather than generate a new, additional post in the micro-blog.

Figure 1B:
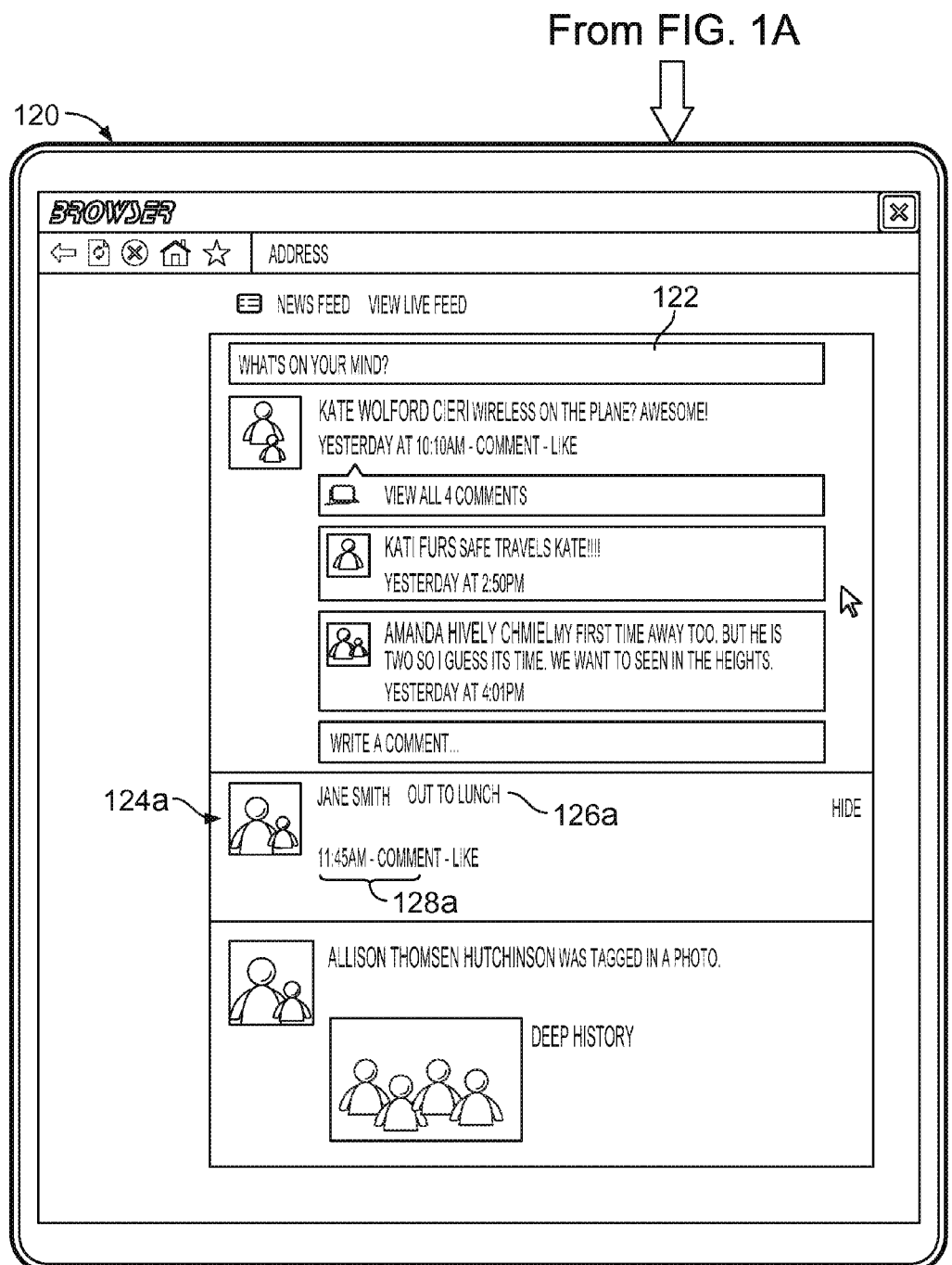
Figure 1D:
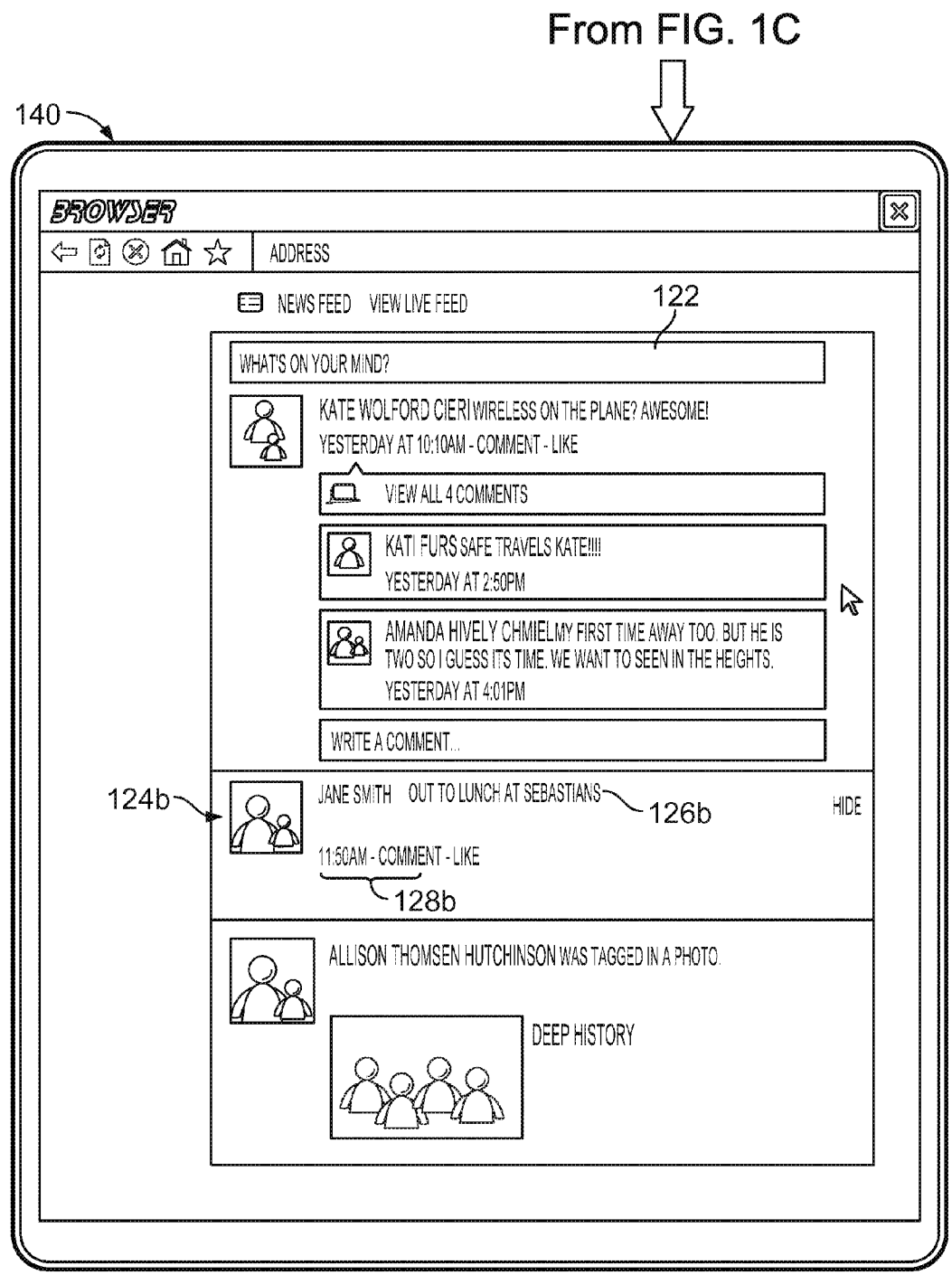

FIG. 1 shows user interfaces 100 and 130 of an e-mail application that includes instant messaging functionality including entry portions to allow a user to post and update status messages. FIG. 1 also shows user interfaces 120 and 140 associated with a micro-blog that includes posts generated based on the status messages from the instant messaging application.

As shown in user interface 100, an instant messaging or chat application 102 can display status messages (e.g., status messages 106a and 108) that communicate the user's current status or provide other information posted by the user. The instant messaging application displays the user's own status message 106a such that the user can view, change, and/or update his/her status message. The user's chat status messages can be further broadcast to a group of individuals associated with the user by posting the status message to a micro-blog. For example, as shown in user interface 100, at 11:45 AM (see 110a) a user Jane Smith has set her status message 106a to include the text 'Out to lunch' to indicate that she is currently at lunch. In addition to being displayed in the instant messaging application the status message can be automatically posted to a micro-blog as shown in user interface 120. When the status message is posted on the micro-blog, the same text 126a 'Out to lunch' appears as a post 124a in the micro-blog. A timestamp 128a displayed with the post 124a indicates when the post 124a was added to the micro-blog or most recently updated.

After entering a status message in the instant messaging system, a user may modify the status message. For example, the user might notice and correct a typographical, grammatical, or other error in the post and/or might decide to include more or less information in the status message. As shown in user interface 130, the user can update his/her status message by entering new or modified text into a status message update box 104. Once the user updates his/her status, the instant messaging application displays the updated status message and no longer displays the previous status message. If such updated status messages are automatically posted to the micro-blog without further review, multiple near-copies could potentially pollute the micro-blog stream (e.g., the post of 'out to lunch' and the post of 'Out to lunch at Sebastians' would appear as separate threads in the micro-blog). In order to prevent the micro-blog from becoming overwhelmed by similar posts based on updates or modifications to status messages, the system classifies the status message as a new status message or an edited version of the previous message. If the status message is classified an edited version of an earlier status message, the earlier entry or post in the micro-blog is replaced with the modified text. On the other hand, if the status message is not classified an edited version of the earlier status message but rather as a new status message, a new entry or post is made to the micro-blog.

Referring back to the example shown in FIG. 1 at 11:50, five minutes after her previous post, Jane Smith adds additional information to her status message by modifying the status message from 'Out to lunch' to 'Out to lunch at Sebastians' (e.g., as shown in user interface 130). When the new status message is transmitted to the micro-blog system, the status message is reviewed and classified as an edit to the prior status message. Accordingly, the micro-blog does not generate a new post, but instead updates (e.g., overwrites or edits) the prior post to include the modified text 126b. It is believed that updating a prior post in the micro-blog rather than generating a new post in the micro-blog can provide the advantage of reducing the number of similar postings made to the micro-blog while at the same time allowing viewers of the micro-blog to view the most up-to-date status message generated by the user. Additionally, if the previous micro-blog post has any comments, the comments are maintained with the updated micro-blog posting instead of being removed. In some examples, the timestamp included in the micro-blog 128b can also be updated to indicate the time of the change in the posting. In some additional examples, the timestamp included in the micro-blog is not updated but rather remains unchanged and shows the time of the original posting as opposed to the time associated with the update or edit to the posting.

Figure 2A:
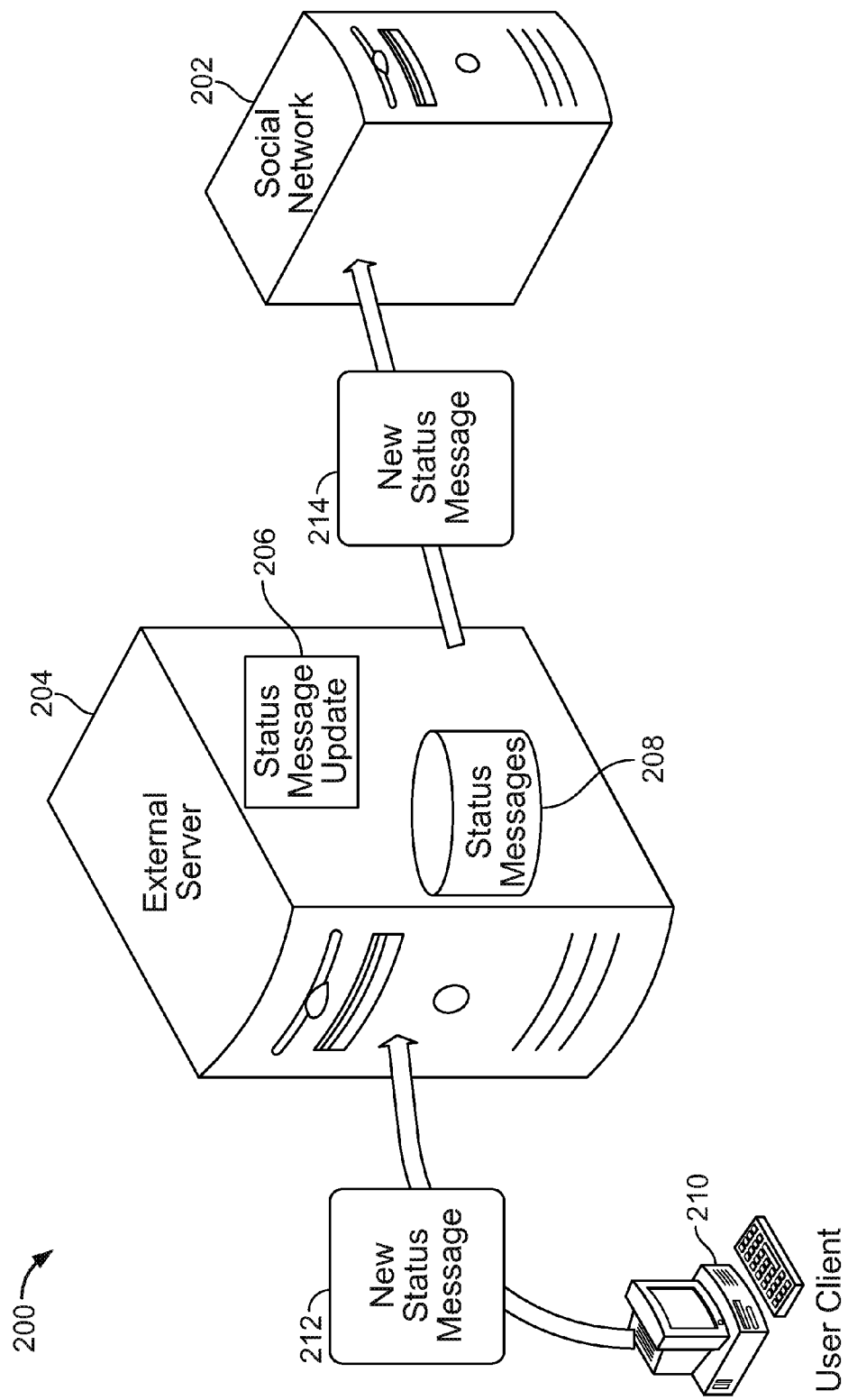
FIGS. 2A and 2B are block diagrams of a system for de-duplication of status messages posted to a micro-blog.
Figure 2B:
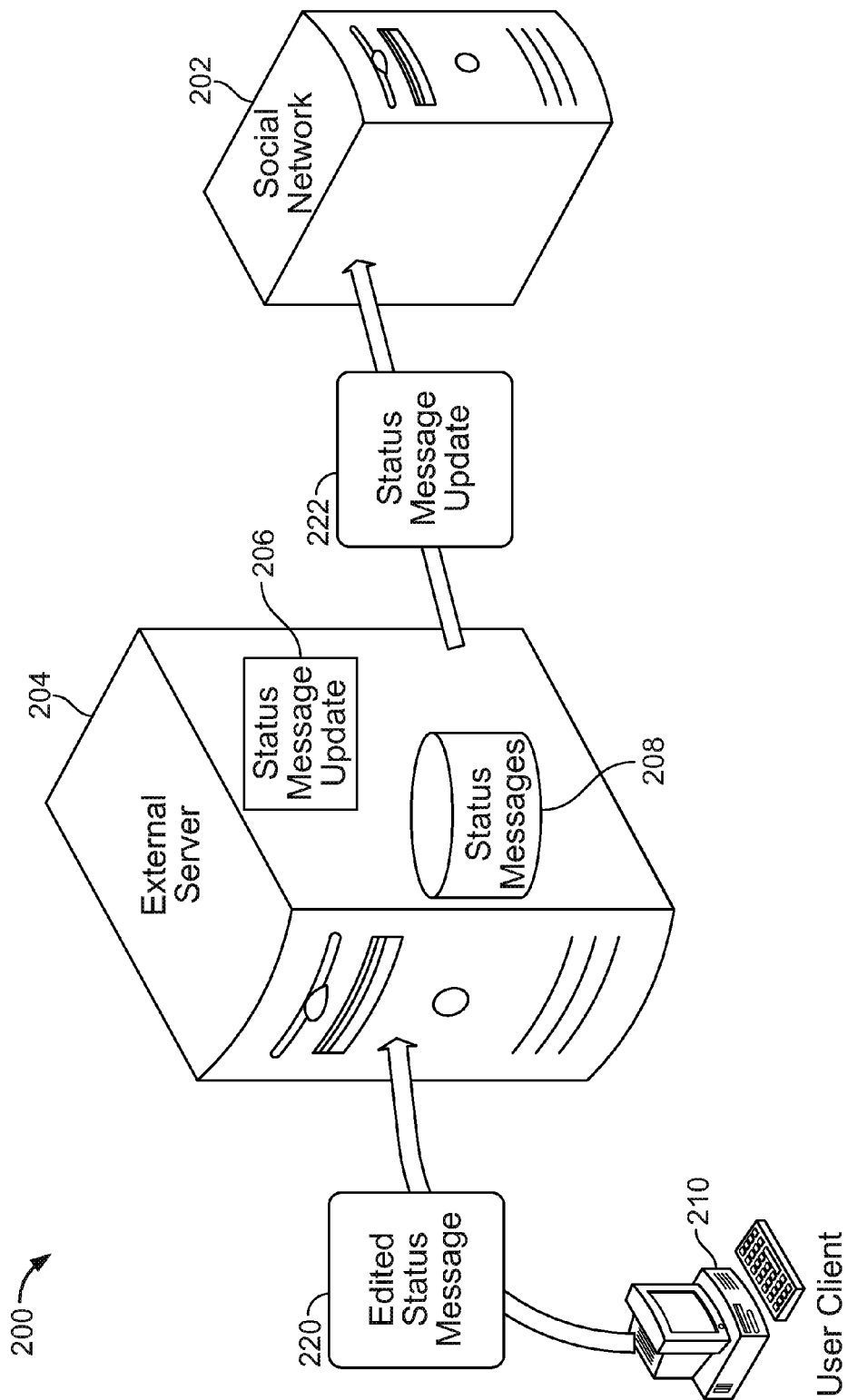

FIGS. 2A and 2B are block diagrams of a system 200 for de-duplication of status messages from an instant messaging application posted to a micro-blog. The system includes a user client 210, an external server 204, and a social network server 202.

The user client 210 is a computer system or other computing device (e.g., a mobile telephone, mobile computer, etc.) that enables a user to enter a status message. The user client 210 is communicatively connected to the external server 204 via a network. Status messages are sent from the user client 210 to the external server 204.

The external server 204 is a computing system that receives status messages from the user client 210 and determines whether the messages are intended as new messages or updates/edits to prior status messages. Server 204 includes a status message update application 206 that includes logic or software for de-duplication of status messages. Based on the outcome of an analysis by the status message update application 206, server 204 either sends a new status message for posting on a micro-blog or sends an edit to a prior status message to replace the prior status message on the micro-blog. While server 204 is shown as being separate from social network server 202, in some examples, the social network server 202 can include the logic or software for de-duplication of status messages and the status messages can be received at the social network server 202 directly from the client 210.

The social network server 202 is a computing system that includes software for managing and updating a micro-blog. The social network server 202 receives content from users and generates new posts in the micro-blog based on the user-generated content. The social network server 202 also receives status messages from server 202 that are posted to the micro-blog.

In operation, a user at the user client 210 enters either a new status message in an instant messaging application (see FIG. 2A) or an edit to a prior status message in the instant messaging application (see FIG. 2B). The new status message 212 or edited status message 220 is sent from the user client 210 to the server 204 over a network. The server 204 receives the new status message 212 or edited status message 220 and analyzes the message to classify the message as either a new status update message or as an edit to a prior status message update using status message update software 206. The classification can be based on temporal aspects of the status message and the prior message (e.g., the amount of time elapsed between receipt of the two messages) and/or the content of the messages (e.g., based on a character comparison of the two messages such as an edit distance). Based on the result of the classification, the server 204 sends either a new status message 214 or a status message update 222 to the social network server 202. The social network server 202 posts the status message as a new post in the micro-blog if the status message is a new status message 214. On the other hand, if the status message is a status message update 222, the social network server 202 replaces the previously posted status message to display the edited status message in the micro-blog.

Figure 3:
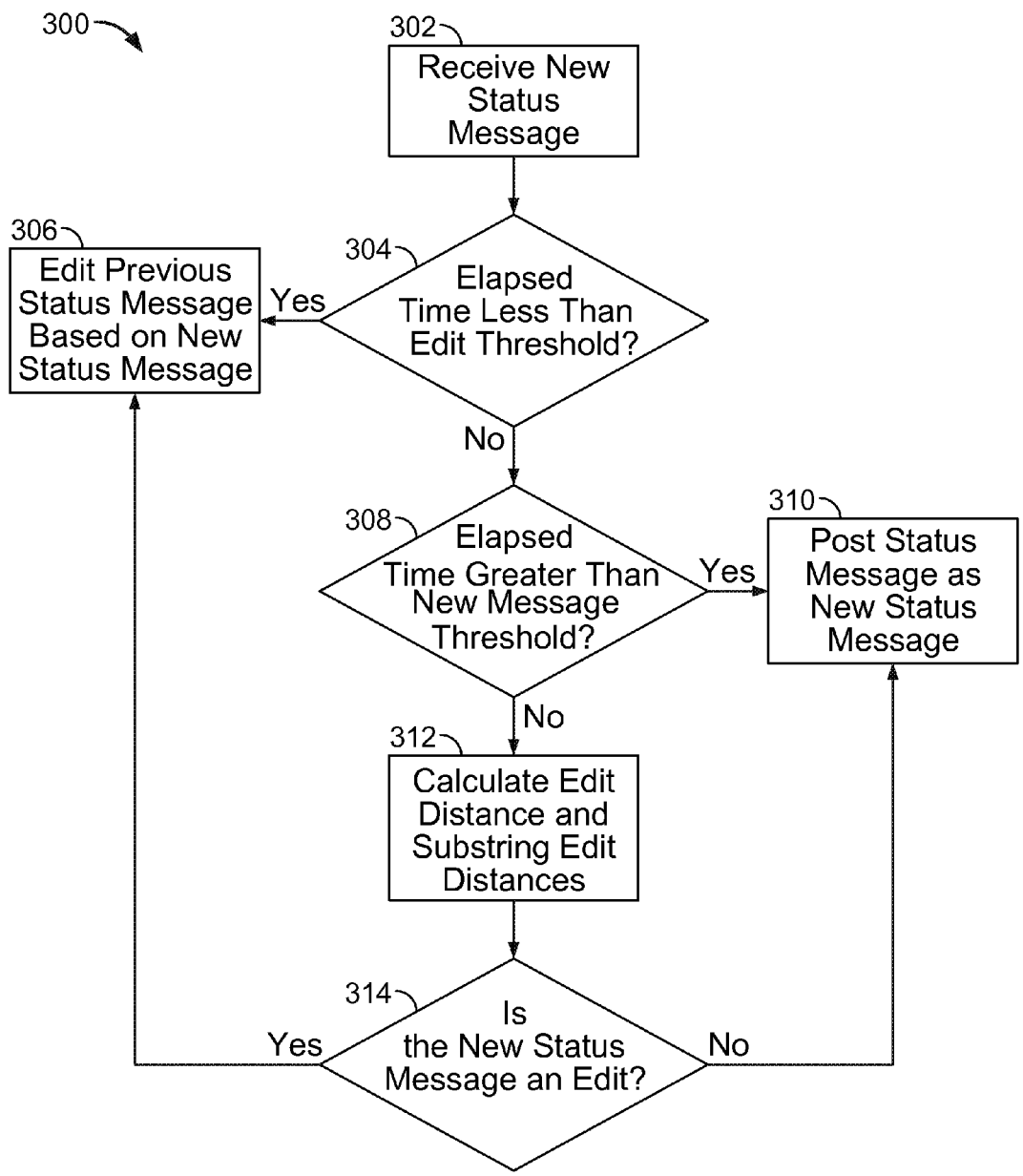
FIG. 3 is a flowchart showing actions taken to post a status message from an instant messaging application to a micro-blog.

FIG. 3 is a flowchart 300 showing actions taken to post a status message from an instant messaging application to a micro-blog. In general, the determination of how the status message should be added to the micro-blog is based on temporal threshold(s) and/or a comparison of the similarity of the status message with the previous status message from the user. A first temporal threshold (referred to as a an edit threshold) provides an amount of elapsed time prior to which any new status message will be considered to be an update or edit to the prior status message regardless of the content of the message. A second temporal threshold (referred to as a new message threshold) provides an amount of elapsed time after which any received status message will be considered to be a new status message regardless of the content of the message. If the elapsed time between the two messages is greater than the edit threshold but less than the new message threshold a comparison of the similarity between the messages is performed using edit distance calculation(s).

More particularly, at box 302, a computing system receives a status message from an instant messaging application. The status message can include user-generated content and/or automatically generated content.

At box 304, the system determines whether an amount of time elapsed between the receipt of a prior status message and the current status message is less than an edit threshold. If the system determines that the elapsed time is less than the edit threshold, the system classifies the received status message as an edit or update to the previous status message. Then, at box 306, the system edits the post in the micro-blog based on the received status message. For example, the previous post can be overwritten by the more recent status message. The value for the edit threshold can be based on various factors such as a time period during which a user's status messages are likely to be edits. Exemplary values for the edit threshold can be from about 5 minutes to about 30 minutes (e.g., from about 5 minutes to about 30 minutes, from about 5 minutes to about 20 minutes, from about 10 minutes to about 20 minutes, about 15 minutes.) For example, if the edit threshold is 15 minutes and the elapsed time between two consecutively received status messages is less than 15 minutes, the most recent status message is considered to be an update or edit to the previous status message and the text of the new status message will replace the text of the previous status message in the micro-blog.

On the other hand, based on the comparison at box 304, if the system determines that the amount of elapsed time is greater the edit threshold, the received status message is not automatically classified as an edit. Rather, at box 308 the system performs a second temporal comparison to determine whether the elapsed time is greater than a new message threshold.

If the system determines that the amount of elapsed time is greater than the new message threshold, the system classifies the message as a new status message (as opposed to an edit or update to a previous status message). Then at box 310, the system posts the received status message to the micro-blog as a new entry or post in the micro-blog (e.g., starts a new thread in the micro-blog). The value for the new message threshold can be based on various factors such as a time period during which a user's status messages are likely to be new messages and not related to their previous status messages. Exemplary values for the new message threshold can be from about 5 hours to about 48 hours (e.g., from about 5 hours to about 48 hours, from about 10 hours to about 30 hours, from about 12 hours to about 30 hours, about 24 hours). For example, if the new message threshold is 24 hours and the elapsed time between two consecutively received status messages is greater than 24 hours, the most recent status message is considered to be new status message and the status message is added as a new post in the micro-blog.

On the other hand, based on the comparison at box 308, if the system determines that the amount of elapsed time is not greater the new message threshold, at box 312 the system calculates an edit distance and one or more substring edit distances. In general, an edit distance is a calculation performed by a computer that determines the number of operations needed to transform one string of characters into another string of characters. There are several different ways to determine an edit distance, and there are various algorithms to calculate its value. Exemplary edit distance algorithms include Hamming distance, Longest common subsequence problem, Levenshtein distance, Damerau-Levenshtein distance, Jaro-Winkler distance, Wagner-Fischer edit distance, Ukkonen's algorithm, and/or Hirschberg's algorithm.

Figure 4A:
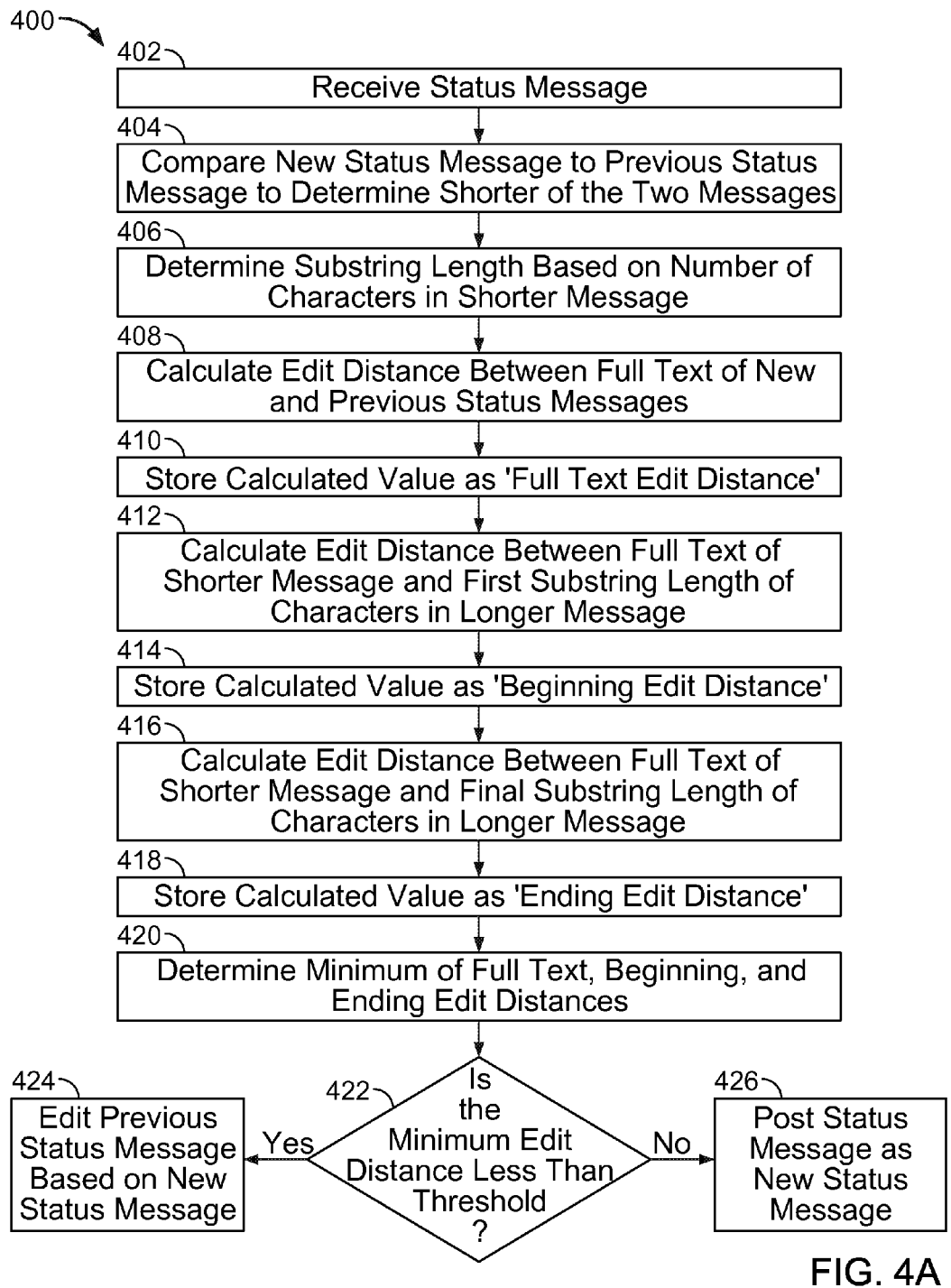
FIG. 4A is a flowchart showing actions taken to determine whether a status message is a new status message or an edited version of a previous status message.

At box 314, the system determines whether the received status message is a new status message or an update to a previous status message based on the calculated edit distances (as described in more detail in relation to FIG. 4). If the system determines that the status message is a new status message (as opposed to an edit or update to a previous status message), then at box 310, the system posts the received status message to the micro-blog as a new entry or post in the micro-blog. If the system classifies the status message as an edit to the prior status message, then at box 306, the system edits the existing post in the micro-blog based on the received status message.

FIG. 4 is a flowchart showing actions taken to determine whether a status message is a new status message or an edit of a previous status message based on the similarity between the two consecutively received status messages. In general, the process is based on three similarity comparisons (e.g., three edit distance calculations). The first, referred to herein as a full text edit distance, is based on a similarity between the entire text of both of the status messages. The full text edit distance can advantageously identify situations where a user modifies one or more words in a status message, corrects typographical errors, corrects spelling errors, or makes other minor modifications to a status message. The second, referred to herein as a beginning edit distance, is based on a similarity between the entire text of the shorter of the two status messages and a beginning portion of the longer status message where the selected beginning portion is equal in length to the shorter status message. The beginning edit distance can advantageously identify situations where a user appends additional text to the end of a previous message. The third, referred to herein as an ending edit distance, is based on a similarity between the entire text of the shorter of the two status messages and an ending portion of the longer status message where the selected ending portion is equal in length to the shorter status message. The ending edit distance can advantageously identify situations where a user adds additional text to prior to the start of the previous message.

At block 402, the system receives a status message. For example, the system can receive a status message entered by a user in an instant messaging or chat application. In additional examples, the system could receive user-generated status messages from other applications that allow a user to enter a short text and/or machine-generated status messages from applications that automatically generate a user status. In yet further examples, the system can be associated with a micro-blog and the message can be an entry to the micro-blog (e.g., as described in FIG. 6).

At block 404, the system compares the received status message to a previous status message from the user to identify the shorter of the two messages (e.g., the message having fewer characters). In order to determine the shorter of the two status messages, the system maintains a copy of the previous post or status messages in a memory and accesses the memory to compare the received status message with the previous status message from the same user. In some examples, the system determines the shorter of the two status messages by generating a character count for each of the messages and selecting the message with fewer characters. For example, if the previously posted message includes the text 'Out to an early lunch with my friend Nick' and the newly received message includes the text 'Eating lunch with my friend Nick,' the system counts the number of characters in the messages to be 41 and 32 characters, respectively. As such, the newly received message is determined to be the shorter message because it includes fewer characters. In some additional examples, the system may take into account items such as photographs, images, and videos in assessing the length of the message.

At block 406, the system determines and stores a substring length based on the number of characters in the shorter of the two status messages. The substring length is stored in a memory. The substring length provides an indication of the number of characters in the shorter of the two status messages. In the example above where the shorter string included the text 'Eating lunch with my friend Nick,' the system stores the substring length as 32 characters.

At block 408, the system calculates a full-text edit distance between the full text of the received status message and the full text of a previously received status message. The edit distance can be calculated based on various similarity calculations such as Hamming distance, Longest common subsequence problem, Levenshtein distance, Damerau-Levenshtein distance, Jaro-Winkler distance, Wagner-Fischer edit distance, Ukkonen's algorithm, and/or Hirschberg's algorithm. The full text edit distance calculation provides a measure of the similarity between the full text of the previous status message and the full text of the current status message. Following the example described above, the full text edit distance calculation compares the text of 'Out to an early lunch with my friend Nick' with 'Eating lunch with my friend Nick.' At block 410, the system stores the calculated value in a memory as the 'full text edit distance.'

At block 412, the system calculates a beginning edit distance based on the full text of the shorter message and the first substring length of characters in the longer message. As such, the beginning edit distance compares the full text of the shorter message to a beginning portion of the longer message (as opposed to the entire text of the longer message) where the beginning portion is determined based on the substring length. Following the example described above, the beginning text edit distance compares the text of 'Eating lunch with my friend Nick' to the first 32 characters of the longer message or 'Out to an early lunch with my fr'. The remaining portion of the longer message, namely 'iend Nick' would not be included in the beginning edit distance calculation. The beginning edit distance can be calculated based on various similarity calculations such as Hamming distance, Longest common subsequence problem, Levenshtein distance, Damerau-Levenshtein distance, Jaro-Winkler distance, Wagner-Fischer edit distance, Ukkonen's algorithm, and/or Hirschberg's algorithm. At block 414, the system stores the calculated value in a memory as the 'beginning text edit distance.'

At block 416, the system calculates an ending edit distance based on the full text of the shorter message and the final substring length of characters in the longer message. The ending edit distance compares the full text of the shorter message to an ending portion of the longer message (as opposed to the entire text of the longer message) where the ending portion is selected based on the substring length. Further the example described above, the ending text edit distance compares the text of 'Eating lunch with my friend Nick' to the last 32 characters of the longer message or '_early lunch with my friend Nick'. The remaining portion of the longer message, namely 'Out to an' would not be included in strings of text compared by the ending edit distance calculation. The ending edit distance can be calculated based on various similarity calculations such as Hamming distance, Longest common subsequence problem, Levenshtein distance, Damerau-Levenshtein distance, Jaro-Winkler distance, Wagner-Fischer edit distance, Ukkonen's algorithm, and/or Hirschberg's algorithm. At block 418, the system stores the calculated value as the 'ending text edit distance.'

At block 420, the system determines a minimum of the full text edit distance, the beginning edit distance, and the ending edit distance. The minimum determination can be performed using an extrema determination that returns the smallest value (minimum) of the stored values for the full text edit distance, the beginning edit distance, and the ending edit distance.

At block 422, the system determines if the minimum is less than a threshold. The threshold can be a numerical threshold or a percentage threshold. If the threshold is a numerical threshold, the minimum edit distance is compared to the threshold value to determine if the minimum edit distance is greater than, less than, or equal to the threshold. Exemplary threshold values can be from about 3 characters to about 10 characters (e.g., from about 3 characters to about 10 characters, from about 3 characters to about 8 characters, about 4 characters). If the threshold is a percentage based threshold, a ratio of the edit distance to substring edit length (e.g., the number of characters in the shorter message) is compared to the threshold value to determine if the ratio is greater than, less than, or equal to the threshold. Exemplary values for a percentage based threshold can be from about 10% of the total number of characters to about 30% of the total number of character (e.g., from about 10% of the total number of characters to about 30% of the total number of characters, from about 15% of the total number of characters to about 25% of the total number of characters, about 20% of the total number of characters). In some examples, both a numerical threshold and a percentage threshold can be used. For example, a message with an edit distance that is less the numerical threshold could be classified as an edit regardless of the percentage of characters that were changed. If the edit distance is greater than the numerical threshold, then the percentage threshold could be used to determine whether the new message is classified as an edit to the previous message.

If the minimum of the three edit distance values is greater than the threshold, at block 426 the system posts the received status message to the micro-blog as a new entry or post in the micro-blog. If the minimum of the three edit distance values is less than the threshold, at box 424, the system edits the post in the micro-blog based on the new status message.

FIGS. 4B-4D show examples of edit length determinations for the full text edit distance, the beginning edit distance, and the ending edit distance. In FIGS. 4B-4D message #1 (e.g., 432, 442 and 452) refers to the previously received message and message #2 (e.g., 433, 443 and 453) refers to the current message. The substring length (e.g., 434, 444, and 454) is the number of characters in the shorter of message #1 and message #2. The tables show the type of edit length calculation, the first string used in the edit distance calculation which is the full text of the shorter of message #1 and message #2, the second string used in the edit length calculation which is the portion of the longer message used for the edit length determination, and the calculated edit lengths. In the examples described in relation to FIGS. 4B-4D, a Levenshtein Distance Calculation was used to determine the edit distance. The Levenshtein distance is the lowest number of characters that must be replaced, inserted or deleted to transform one string into another.

In FIG. 4B, message #1 (block 432) includes the text "BRB" and message #2 (block 433) includes the text "BRB, out to lunch". These messages differ in that in the newer message the user has added additional text to the end of the previous message. As such message #1 is the shorter of the two messages and is used as the first string. Message #1 includes 3 characters so the substring length 434 is 3. For the full text edit distance calculation, the full texts of message #1 and message #2 are used in the edit distance calculation (as shown in row 435) resulting in an edit distance of 14. For the beginning edit distance, the calculation is performed using the full text of message #1 (e.g., BRB) and the first 3 characters of message #2 (e.g., BRB) resulting in a beginning edit distance of 0 (as shown in row 436). For the ending edit distance, the calculation is performed using the full text of message #1 (e.g., BRB) and the last 3 characters of message #2 (e.g., nch) resulting in an ending edit distance of 3 (as shown in row 437). As seen from this example, when a user adds text to the end of a previous message, the full text edit distance can be large even though the message is intended to be an edit of the previous message. Using the beginning edit distance, it becomes clear that a portion of the message is similar to the previous message because the user has appended text to the end of the prior message (due to the low beginning edit distance value). As such, the status message can be classified as an edit.

In FIG. 4C, message #1 (block 442) includes the text "It's finally Friday" and message #2 (block 443) includes the text "It's finally Friday". These messages differ in that the word 'Friday' was misspelled in the first message to include an extra 'i'. As such message #2 is the shorter of the two messages and is used as the first string. Message #2 includes 20 characters so the substring length 444 is 20. For the full text edit distance calculation, the full texts of message #1 and message #2 are used in the edit distance calculation (as shown in row 445) resulting in an edit distance of 1. For the beginning edit distance, the calculation is performed using message #2 (e.g., It's finally Friday) and the first 20 characters of message #1 (e.g., It's finally Frida) resulting in a beginning edit distance of 2 (as shown in row 446). For the ending edit distance, the calculation is performed using the full text of message #2 (e.g., It's finally Friday) and the last 20 characters of message #1 (e.g., t's finally Friday) resulting in a ending edit distance of 2 (as shown in row 447). As seen from this example, when a user amends or corrects a word in the middle of the message, the full text edit distance value may be the lowest of the edit length values and may be used to classify the second message as an edit.

In FIG. 4D, message #1 (block 452) includes the text "Go Purdue, exciting game!" and message #2 (block 452) includes the text "exciting game!". These messages differ in that text has been removed from the beginning of the previous message. As such message #2 is the shorter of the two messages and is used as the first string. Message #2 includes 14 characters so the substring length 454 is 14. For the full text edit distance calculation, the full texts of message #1 and message #2 are used in the edit distance calculation (as shown in row 455) resulting in an edit distance of 11. For the beginning edit distance, the calculation is performed using the full text of message #2 (e.g., exciting game!) and the first 14 characters of message #1 (e.g., Go Purdue, exc) resulting in a beginning edit distance of 12 (as shown in row 456). For the ending edit distance, the calculation is performed using the full text of message #2 (e.g., exciting game!) and the last 14 characters of message #1 (e.g., exciting game!) resulting in a ending edit distance of 0 (as shown in row 457). As seen from this example, when a user removes text from the beginning of a message the full text edit length and the beginning text edit length may both be high, however, since the ending edit length is low (or 0 in this case) the message can be correctly classified as an edit.

In some examples, the actions taken to post a status message from an instant messaging application to a micro-blog can additionally take into account whether the previous message has any comments (e.g., any additional postings by other users in response to the micro-blog entry). In some embodiments, if the previous message has comments the new message is classifies as a new status message and the system posts the received status message to the micro-blog as a new entry or post in the micro-blog. In some additional embodiments, the system can determine how to classify the received status message based on the type of edits that are made from the previous message. For example, the threshold for considering the message to be a new message can be higher if the previous post already has comments associated with it. The threshold can be increased by simply increasing the actual edit distance thresholds or by taking into account the type of edits or extent of the edits that have been made. For example, the a minor typographical correction (e.g., an edit that would result in the received status message being classified as an edit based on the full text edit distance) could result in the system editing the previous message while a more substantial change (e.g., an edit that would result in the received status message being classified as an edit based on the beginning or ending text edit distance) could result in the creation of a new posting to the micro-blog even if the changes would have replaced a previous message if the previous message had no comments.

Figure 5:
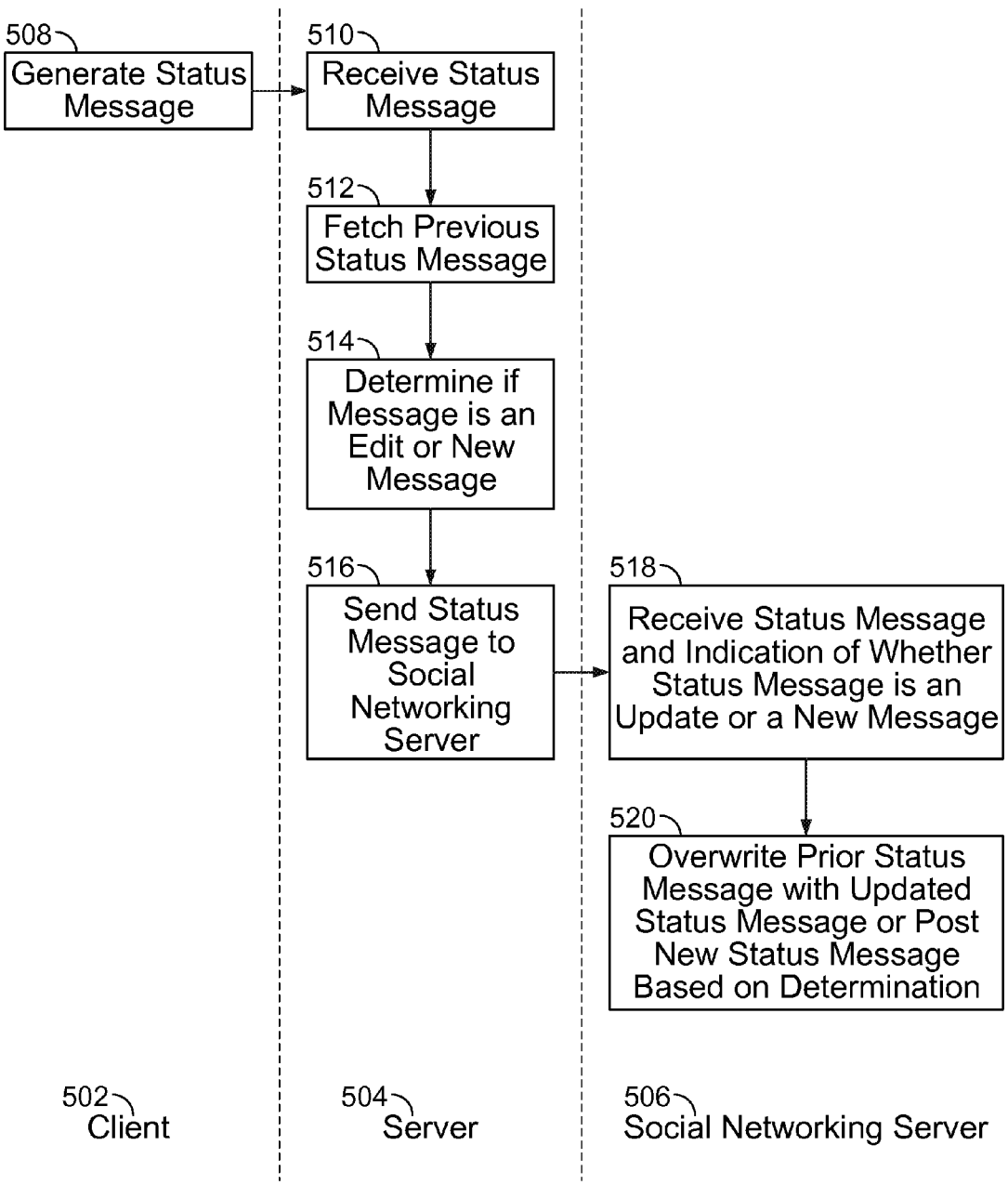
FIG. 5 is a diagram of showing actions taken by a client system, a server, and a social networking server to post status messages to a micro-blog.

FIG. 5 is a diagram of showing actions taken by a client system, a server, and a social networking server to post status messages to a micro-blog. At the client system, a user generates a status message (block 508). The server receives the status message (block 510) and fetches the previous status message (block 512). The previous status message can be fetched from a memory in the server or from the social networking server. The server determines whether the status message is a new message or an edit of a prior message (e.g., using one of more of the methods described herein) (block 514). The server then sends the status message to the social networking server (block 516) and the social networking server receives the message and an indication of whether the message is a new status message or an update to an existing status message (block 518). After receiving the status message, the social networking server posts the message as a post in the micro-blog (block 520). If the status message is an update to an existing status message, the social networking server overwrites the previous status message with the updated status message. If the status message is a new status message, the social networking server posts the status message as a new post (e.g., the start of a new thread) in the micro-blog.

While systems and methods for updating a micro-blog based on changes to status messages in an instant messenger system are described above, similar updates can be made to a micro-blog based on similar posts to the micro-blog. For example, after generating a post to a micro-blog, a user may not be completely satisfied with the text of his/her post. For example, the user may notice an error in the post or may desire to change the wording of the post. One method of changing a post is for the user to delete the post and then generate a new post that includes the desired, modified text. However, the process of deleting a post and generating a new post can be cumbersome to make small changes in a post. As such, it is believed to be advantageous to allow the user to simply update the text of an existing post rather than require the user to first delete the previously generated post. In order to update a prior post, upon receiving a post to the micro-blog, the system classifies the post as a new post or an edited version of a prior post (e.g., using one or more of the methods described herein). If the post is an edited or updated version of the earlier post, the earlier post in the micro-blog is overwritten with the modified text. Once the entry is overwritten with the updated post, users who view the micro-blog will no longer see the original post but will see the updated post instead. On the other hand, if the post is not an edited version of the earlier post, a new entry or post is made to the micro-blog.

Figure 6A:
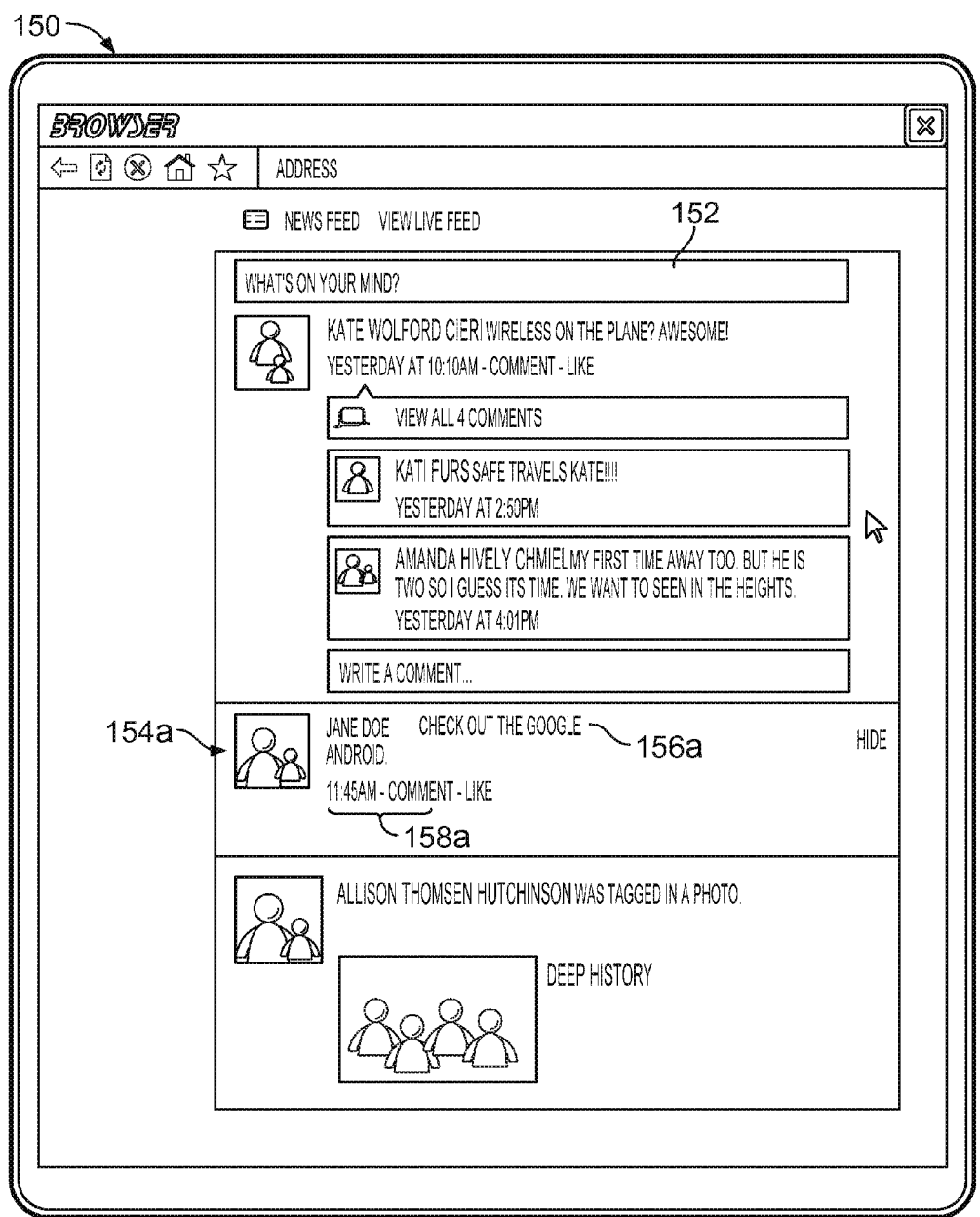
FIG. 6 is a diagram of a user interfaces associated with a micro-blog.
Figure 6B:
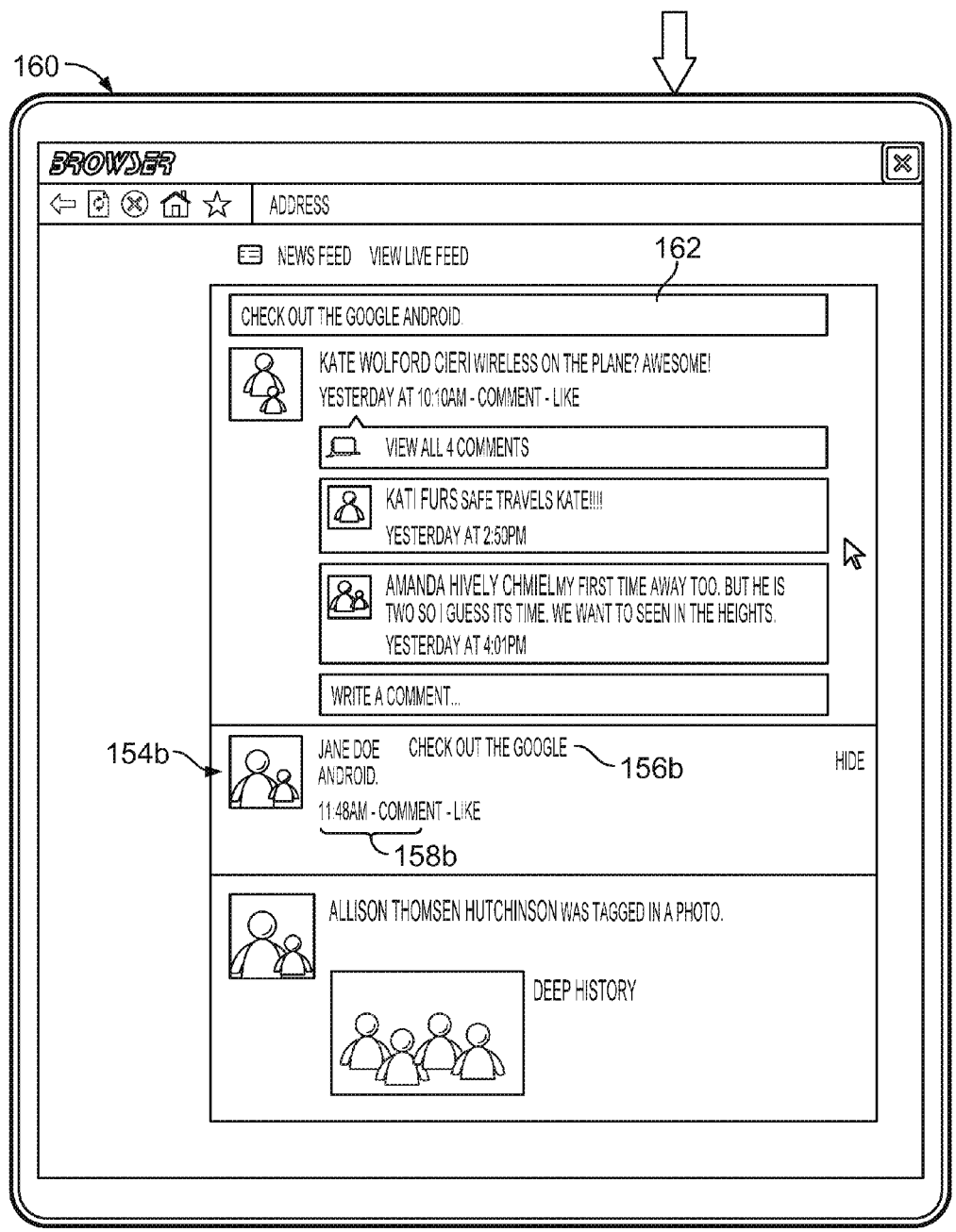

For example, referring to FIG. 6, as shown in user interface 150 user Jane Smith has made a post 154*a* to a micro-blog including the text 'Check out the Gooogle Android." If user Jane Smith later notices that she has misspelled Google by including an extra 'o,' the user can retype the message in the entry box 162. Upon receipt of the new, updated posting, the system compares the post (e.g., Check out the Google Android) to the prior post (e.g., Check out the Gooogle Android) and classifies the post as an edited version of the prior posting. The system then updates the prior posting to replace the text of the earlier post with the text of the new post. As such, visitors to the micro-blog will see the updated entry with the correct spelling rather than see the previous entry.

Figure 7:
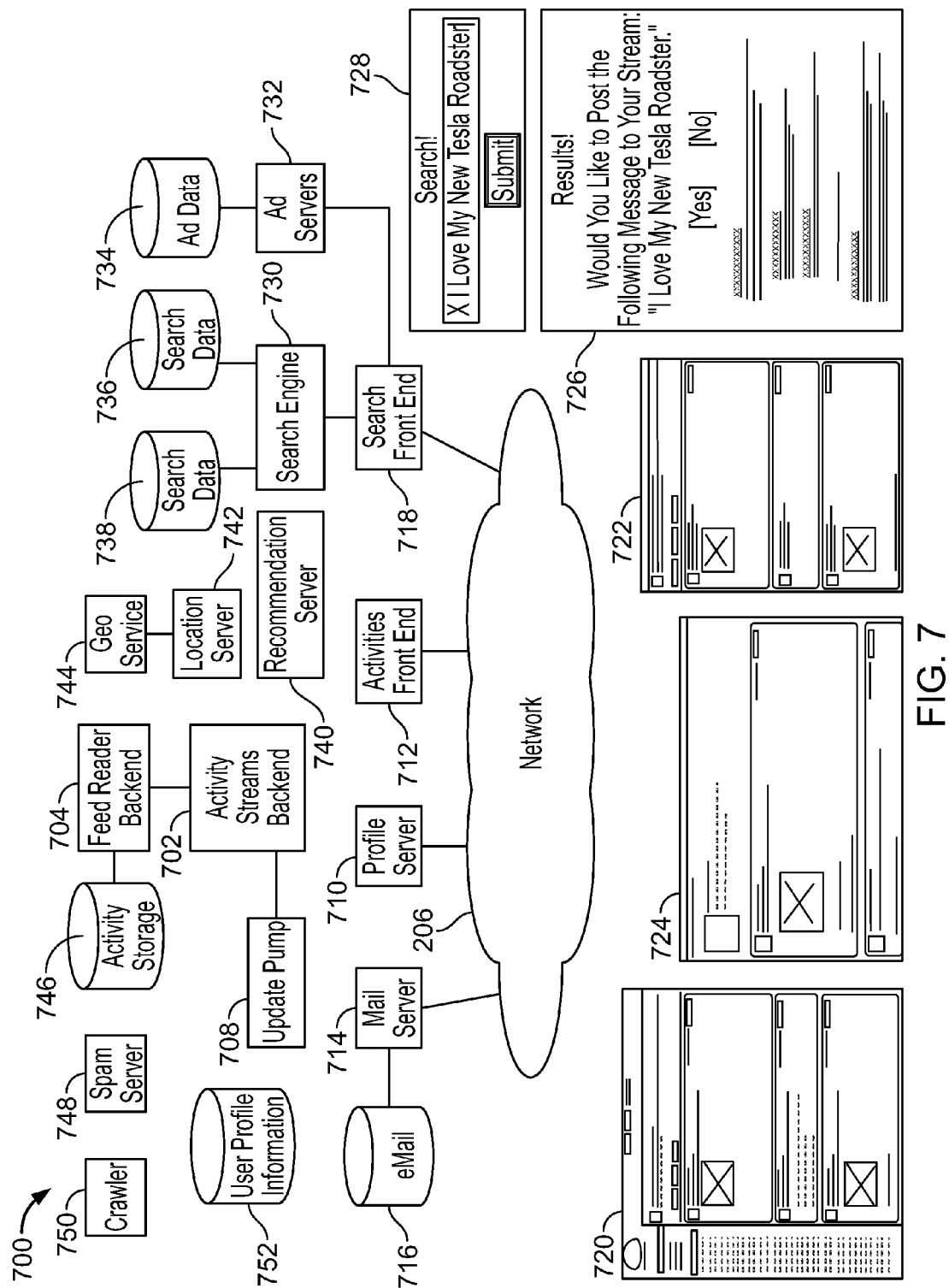
FIG. 7 is a block diagram of a system.

FIG. 7 is a schematic diagram of a system 700 within which the various features described in this document may be implemented. In general, the system 700 permits various users to post, review, and comment on various activity streams of information, within a social networking framework. For example, a user may make a micro-blogging post about a recent happening in the user's life or about a news article the user recently read. That post may be forwarded to other users who have chosen to follow the first user (who may be an individual or an organization). Those other users may see the post using a stream reader, or the post may be displayed in their email applications (e.g. either in line with their regular email messages or under a separate tab). Those users may choose to comment on the post, and other users may also comment on the post or comment on the comments of other users. Such comments may be included and shown in the various users email application even if they were made after the post was originally connected to the email application. Thus, the various types of feedback may be made available to each user conveniently in one place. Users may also see posts related to other users my visiting profile pages for those other users, and may also go to their own profile pages or to their stream pages to see all of the posts and comments for posts to which they are subscribed.

The various posts, and comments on posts, are managed in the system 700 by an activity streams backend 702, which is in charge of implementing business logic that defines the manner in which various submissions to the system 700 will be handled. The activity streams are characterized by activities, which are the subjects of posts (e.g., micro-blog posts) that users submit to the system 700, and various comments directed toward those activities. For example, a user may post an activity regarding a web page they are currently viewing by pasting a URL of the page into a posting page. Such action may cause the system 700 to gather important information form the URL, including images displayed on the page, headings, labels for images, or topical terms that describe a topic of the page (e.g., as previously determined by analysis of the words on the page, such as using ADSENSE analysis of the page). The system 700 may also obtain location information, such as the current location of the user, and/or a venue with which the user is most currently associated (e.g., that the user checked into recently or identified as a venue in which the user is located).

The activity streams back-end 702 also implements logic for determining what users are to receive posts, comments on posts, and other portions of streams in the system 700. In particular, users who have subscribed to receive posts form other users may be provided with posts when they log into the system 700, users may nominate other users to receive copies of streams when those other users would not ordinarily be included in the streams (e.g., by typing in identifiers for those other users when reviewing a post), and users may send streams directly to each other, among other things.

The feed reader back end 704 manages storage of posts and related data for the system 700. The feed reader back end 704 may rely on various levels of activity storage 746 to store posts, comments, on posts, and other information needed to construct streams for users when they request information from system 700. As with the other components shown in this figure, the feed reader back end 704, though shown as a single block, can be implemented using a number of different servers or server sub-systems Likewise, the activity storage 746 can be implemented across a number of databases and database types, and across a variety of servers and server sub-systems.

When posts or other updates are received by the activity stream back-end 702, they are formatted and provided to update pump 708. The update pump 708 is responsible for provided notices about newly-posted information to various services that may need such information. It acts, in effect, as a router and distributor of information relating to the system 700. For example, a mail server 714 may include functionality for integrating the display of streams, and may thus need to know about new posts so that users of a mail client can be shown immediately when new information is posted. In a similar manner, a search engine 730 may provide search results to users that include real-time updating information from various posts that users are supplying to the system, and can receive such updated information by interacting with the update pump 708 via understood APIs and remote procedure calls (RPCs) where the two components are sub-components of a larger organization-wide system.

Various web front-ends are provided to permit the system 700 communicate over a network 706, such as the internet (and adjacent supporting networks). For example, the mail server 714 may provide typical web-based electronic mail functionality, though with the integration of posts and comments into users' in boxes, via a mail client 720. For example, streams may show up as discrete messages in user's in box, and may be updated in real time to include the latest comments on the streams and originating posts for the streams. Such content may be active, in that a user may be allowed to interact with it substantially to a level that they could if they were reviewing the streams in a dedicated stream reader. For example, selectable controls may be provided with a stream that is displayed by the email client 720, and a user may choose one in order to post a comment to be added to a stream, without having to leave the context of the message within the email client 720.

A profile server 710 generates code for representing user profiles such as profile 722 of user Joe Blow. The profile page may take the form of a standard feed page from a social networking site, arranged with a list of posts and comments from other users in reverse chronological order. In a similar manner, an activities front end 712 can generate a similar feed for a user's feed page 724, here for a user named Susie User. The profile page 722 and the feed page 724 may be very similar to each other, and can present content similar to that presented as part of a posting or micro-blogging section of mail client 720. In one example, the profile page 722 is what third parties see when they look at the user's account, while the feed page 724 is what the user himself or herself sees.

A search engine 730 and associated search front end 718 may provide a different sort of functionality for the system 700. Specifically, the search front end 718 may allow users to provide posts or comments from non-traditional sources, such as search boxes, e.g., on a search web page or in a search box on a toolbar installed on their machines an operating in concert with their web browsers. Such posts or comments may be submitted by users and may be received by the search front end in a standard manner, just as search requests are. The intent of a user to submit a post rather than a search query (or in addition to a search query) may be determined by syntactical analysis of the submission. In one example, if a query is preceded by the letter "z", with a space after it (see screen 728)—a construct that is seldom submitted as a real search query—the system may parse the submission apart and assume, from the syntax, that the user intends to post the remainder of the submitted query as a post to their social network.

Such a post may be made immediately or after confirming with the submitting user that they would like to make a posting. For example, a search results page 726 may be generated that contains actual search results for the submitted query (whether with or without the preceding "z") generated by the search engine 730 using data from index 738 in a conventional manner, and may be displayed below an area that shows the user the form of a proposed post and selectable controls by which the user can edit the post and can then confirm an intent to post the information to friends, followers, or others. The post may then be forwarded by the search front end 718 to the activity streams backend 702, along with identifying information for the user (e.g., a user ID identified from a cookie on the user's computing device when the user is logged onto a broader service that implements the system 700).

Other syntax submitted by a user may produce different results. For example, if a user enters an email address (e.g., of the form "name@domain.com"), the system may identify that syntax as indicating an intent to send the remaining text of the submission as an email message to the user at the provided email address. Likewise, if the user starts a submission with a control character followed by a communication mode identifier, the remainder of the submission may be submitted for posting in tat communication mode, either without or without first presenting the proposed action to the user and confirm that the user intends such a communication to occur. For example, if a user types "z blog I'm having a great time," the syntax may indicate to the system 700 that the user would like to post the submitted phrase "I'm having a good time" to the user's blog (where the identity of the blog may be determined by the system 700 using a user ID stored as a cookie on the user's computing device, and which can be correlated to an account for the user that is in turn correlated to the blog).

The search results and other information (e.g., posts and email messages) may be accompanied by targeted advertisements directed to the search query or other similar information, such as profile information, the text of posts or comments by a user, the text of posts or comments of users who have a relationship with a user (e.g., as friends, followers, or users that the first user follows). Such advertisements may be served, through the search front end 718, or the other front ends 710, 712, 714 to users of the system 700 and may be targeted using techniques like those employed in GOOGLE ADWORDS OR ADSENSE. Such serving of advertisements may depend on ad data in database 734, which may include information about advertisers, the text and other content for the advertisements, bid prices submitted by the various advertisers, and other relevant information needed to serves advertisements that are directed to users and/or streams of information directed from or to the users.

Various location-based services may be integrated with posts or comments, such as by identifying the locations (e.g., lat/long coordinates) or venues (e.g., stores, arenas, bars, or restaurants) from which posts or comments are made. Such services are provided in this example system 700 by a location server 742 and geo service 744. The location server 742 generally provides information about venues or other landmarks in response to receiving location information about a user of system 700. For example, when a user submits a post, geo-coordinates for the user may be provided with the post (e.g., via GPS functionality on the user's mobile computing device) or may be determined for the user by the system 700 (e.g., via cell tower or access point identification or triangulation). The geo-location information may be an estimated latitude and longitude of the mobile computing device and information identifying an accuracy of the estimation. The location server 742 may be made available through an API to various other components of the system 700.

The location server 742 may use such geo-location information to identify one or more venues (e.g., stores, restaurants, or bars) in the general location of the user, may use proximity of the user to each venue and other signals (e.g., popularity of each venue as determined from search queries submitted with the venue name, check-ins at the venue by users of the system 700, a volume of activity associated with posts from the venue, a reputation of a post's author, for example, through number of subscribers, a volume of comments on posts, or a similarly determined reputation of the subscribers) to provide a ranked list of venues in the geographic area that the user may be in. The user may be presented with a single suggestion for a venue or several suggested venues. The user may then select one such venue, and that venue may be associated with the post when other users review it. For example, the post may be accompanied by meta data indicating that the post was "Posted from Dive Bar," and other users may select the name "Dive Bar" to see additional information about the venue, including other posts from the venue, ratings of the venue, streams that belong to the venue (e.g., if a manager of the venue has made the venue a user of the system 700) and other similar information.

The location server 742 may obtain information that it needs to provide such functionality from various external services, such as geo service 744. Geo service 744 may be a service that communicates via standard APIs to receive location information (e.g., lat/long coordinates) and to provide more advanced information in response. The more advanced information may include a street address that is determined to be associated with the lat/long coordinates (e.g., a street address that is nearest to a particular location represented by the lat/long coordinates). The more advance information may also include a list of venue names that are geographically near the particular location, street addresses for the venues, descriptive information for the venues, map tiles that are associated with the particular location, and a relevance score for each venue. The relevance score for each venue may identify how relevant the particular venue is based on any combination of (i) the received location information, (ii) an accuracy of the received location information, and (iii) a distance between the venue and a location identified by the received location information.

Other components may interact with the components already described to provide additional functionality foe the system 700. For example, a crawler 750 may crawl various posts and comments for the purpose of indexing the content in the system 700, so that, for example, search engine 730 may readily deliver search results that include the latest postings by users to the system 700. Also, spam server 748 may communicate with the activity streams backend 702 and/or the update pump 708 to identify posts or comments that may be inappropriate (e.g., offensive, abusive, or otherwise inappropriate), duplicative, deceptive (e.g., in which one user poses as another user), and to act appropriately with respect to such content (e.g., providing for automatic and/or manual review of the content and perhaps removing the content from the system 700 or making the content hidden).

Finally, a recommendation server 740 may be provided with any new activity or post that is submitted to the system 700 (e.g., via the activity streams back-end 702). The recommendation server 740 may write back to the activity streams backend 702 about the number of people who should receive the activity. Such information may be saved so that the next time a message is sent out about the activity (e.g., a comment on the activity), the new recommended users also get the activity. A quality score can be computed when determining what users should receive an activity, and the score can be determined by factors such as the distance of relationship between a user and other users who have posted to or recommended an activity, interests of a user as identified in the user's profile (e.g., the user is a member of a classic cars group in a social network, and thus is more likely to receive notices about activities relating to classic cars), or interests as identified by posts or other submissions that the user makes, users or activities that the user follows, and the like. A quality threshold may be set by the recommendation server 740 in order to maintain an adequate level of recommendations (not too many and not too few).

Using the components described here, then, the system 700 may provided for integration of various modes of posting and receiving content that is provided in streams, such as microblog posts and comments on such posts. Users may post in various ways, including directly into search boxes on search pages or toolbars, so that such users may be more tightly integrated into systems provided by the providers of the pages or toolbars, and may provide posts in contexts with which they are already very familiar. Also, the users may review posts and other content in their email client, also in a manner that is already familiar to them and does not require them to leave a familiar application in order to review such posts. Moreover, the content may be rich for the users, such that it may include information about locations and venues at those locations (from which a reader of the content may obtain additional information, such as from hyperlinks provided in posts), and the users may respond to posts in-line, such as from their email applications. In all these, ways the system 700 may provide a communication facility that allows a user simpler and more complete interaction with friends and with other users, and may increase the level of knowledge that is made available to the users of the system 700.

Figure 8:
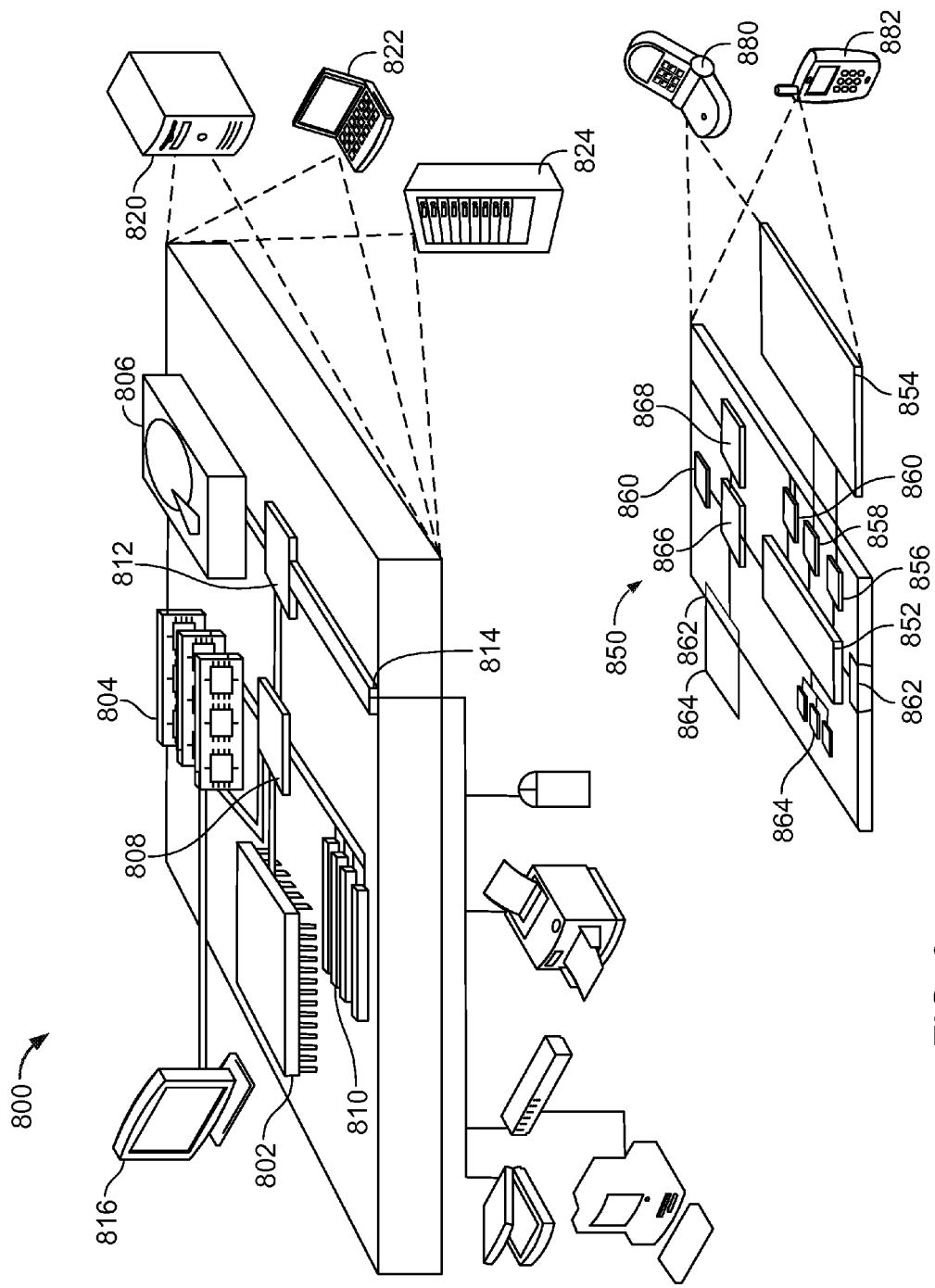
FIG. 8 is a block diagram of a computer system.

FIG. 8 shows an example of a generic computer device 800 and a generic mobile computer device 850, which may be used with the techniques described here. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, memory on processor 802, or a propagated signal.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, memory on processor 852, or a propagated signal that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smartphone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal.

The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for de-duplication of status messages or posts to a micro-blog may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method of de-duplication of messages in a micro-blog, the method comprising:
   receiving, at a computer system, a first message;
   posting the first message to the micro-blog;
   receiving a second message;
   classifying the second message as one of a new message and an edited version of the first message, wherein classifying the second message comprises,
      calculating a first edit distance based on a comparison of text in the first and second messages;
      calculating a second edit distance based on a comparison of the text in a shorter of the first and second messages and a beginning portion of a longer of the first and second messages;
      calculating a third edit distance based on a comparison of the text in the shorter of the first and second messages and an ending portion of the longer of the first and second messages;
   updating the first message in the micro-blog based on the second message if the second message is classified as an edited version of the first message; and
   posting the second message to the micro-blog in addition to the first message if the second message is classified as a new message.

2. The method of claim 1, wherein updating the first message in the micro-blog based on the second message comprises overwriting the first message.

3. The method of claim 2, wherein overwriting the first message in the micro-blog comprises displaying the second message and removing the first message.

4. The method of claim 1, wherein receiving the first message comprises receiving a first user-generated status message from an instant messaging application and receiving the second message comprises receiving a second user-generated status message from the instant messaging application.

5. The method of claim 1, wherein classifying the second message further comprises classifying the second message based on a measure of similarity between the first and second messages.

6. The method of claim 1, wherein classifying the second message further comprises classifying the second message based on one or more of the first, second, and third edit distance calculations.

7. The method of claim 1, wherein classifying the second message further comprises:
   determining a minimum of the first, second, and third edit distances;
   comparing the minimum to an edit distance threshold; and
   classifying the message as the edited version of the first message if the minimum is less than the edit distance threshold.

8. The method of claim 7, wherein the edit distance threshold comprises a number of operations to transform one of the first message and the second message into the other one of the first and second messages.

9. The method of claim 7, wherein the edit distance threshold comprises a ratio of a number of operations to transform the shorter of the first message and the second messages into the longer of the first and second messages to the number of characters in the longer of the first and second messages.

10. The method of claim 1, wherein classifying the second message further comprises classifying the second message based on one or more temporal thresholds.

11. The method of claim 10, wherein the one or more temporal thresholds comprise an edit threshold; and classifying the second message further comprises classifying the second message as the edited version of the first message if an elapsed time between receipt of the first and second messages is less than the threshold.

12. The method of claim 10, wherein the one or more temporal thresholds comprise a new message threshold; and classifying the second message further comprises classifying the second message as the new message if an elapsed time between receipt of the first and second messages is greater than the new message threshold.

13. An electronic system for de-duplication of messages in a micro-blog, comprising: a memory; and a processor configured to:
   receive a first message;
   post the first message to the micro-blog;
   receive a second message;
   classify the second message as one of a new message and an edited version of the first message, wherein to classify the second message, the processor is further configured to:
      calculate a first edit distance based on a comparison of text in the first and second messages;

calculate a second edit distance based on a comparison of the text in a shorter of the first and second messages and a beginning portion of a longer of the first and second messages;

calculate a third edit distance based on a comparison of the text in the shorter of the first and second messages and an ending portion of the longer of the first and second messages;

update the first message in the micro-blog based on the second message if the second message is classified as an edited version of the first message; and post the second message to the micro-blog in addition to the first message if the second message is classified as a new message.

14. The system of claim 13, wherein the processor is further configured to receive the first and second status messaged from an instant messaging application.

15. The system of claim 13, wherein the processor is further configured to classify the second message based on one or more of the first, second, and third edit distance calculations.

16. The system of claim 13, wherein the processor is further configured to classify the second message by:
determining a minimum of the first, second, and third edit distances;
comparing the minimum to an edit distance threshold; and
classifying the message as the edited version of the first message if the minimum is less than the edit distance threshold.

17. The system of claim 13, wherein the processor is further configured to classify the second message based on one or more temporal thresholds.

18. An electronic system for de-duplication of messages in a micro-blog, comprising:

a device configured to receive first and second messages;
a device configured to post the first message to a micro-blog; and
means for classifying the second message as one of a new message and an edited version of the first message, wherein the means for classifying the second message comprises,
means for calculating a first edit distance based on a comparison of text in the first and second messages;
means for calculating a second edit distance based on a comparison of the text in a shorter of the first and second messages and a beginning portion of a longer of the first and second messages;
means for calculating a third edit distance based on a comparison of the text in the shorter of the first and second messages and an ending portion of the longer of the first and second messages; and
means for updating the micro-blog based on the classification.

19. The system of claim 18, wherein the means for updating the micro-blog based on the classification further comprises means for updating the first message in the micro-blog based on the second message if the second message is classified as the edited version of the first message and posting the second message to the micro-blog in addition to the first message if the second message is classified as the new message.

20. The system of claim 18, wherein the means for classifying the second message further comprises means for classifying the second message based on one or more of the first, second, and third edit distance calculations.

* * * * *